INVENTOR.
WILLIAM A. GILBERT
BY *Salter & Michaelson*
ATTORNEYS

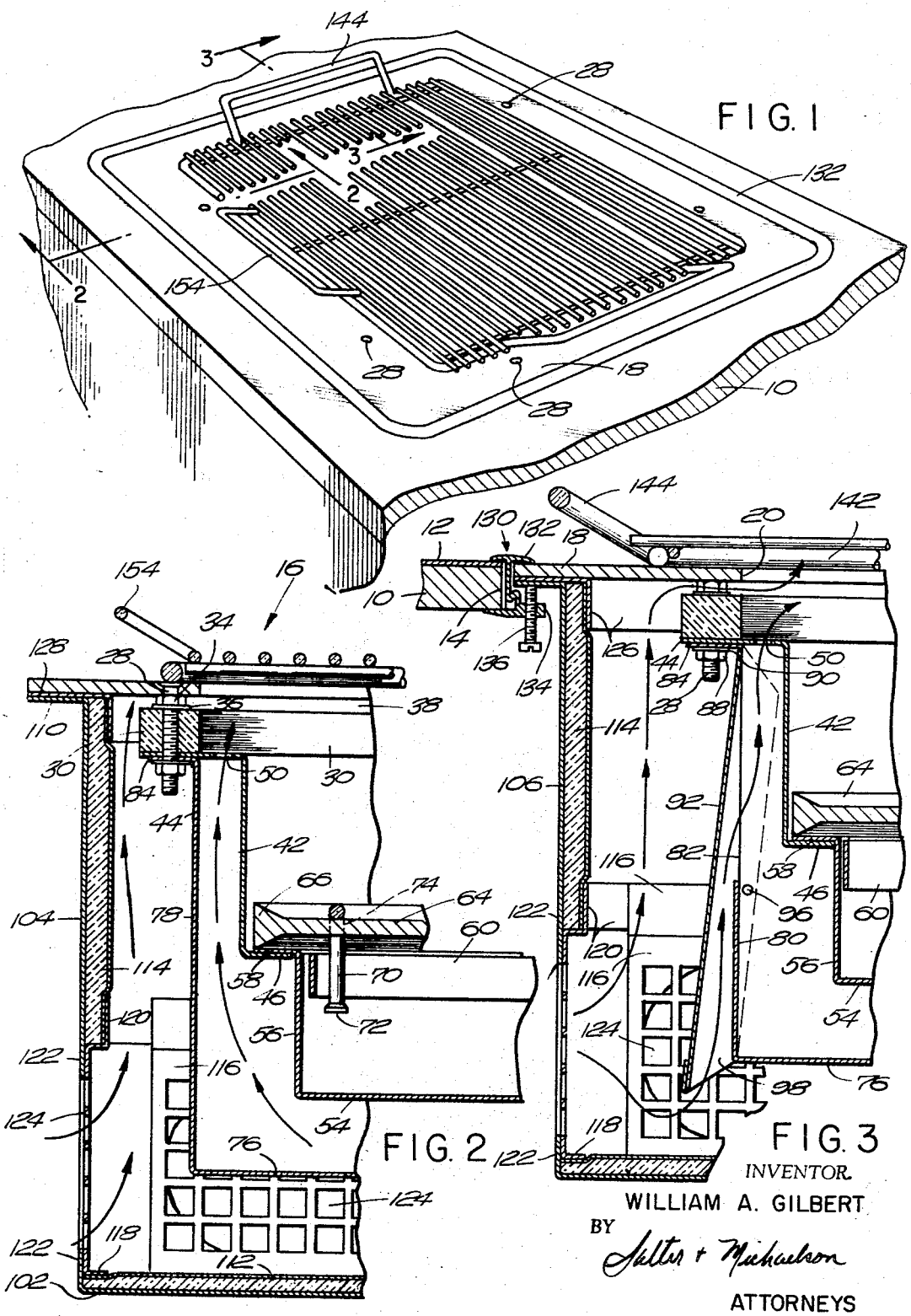

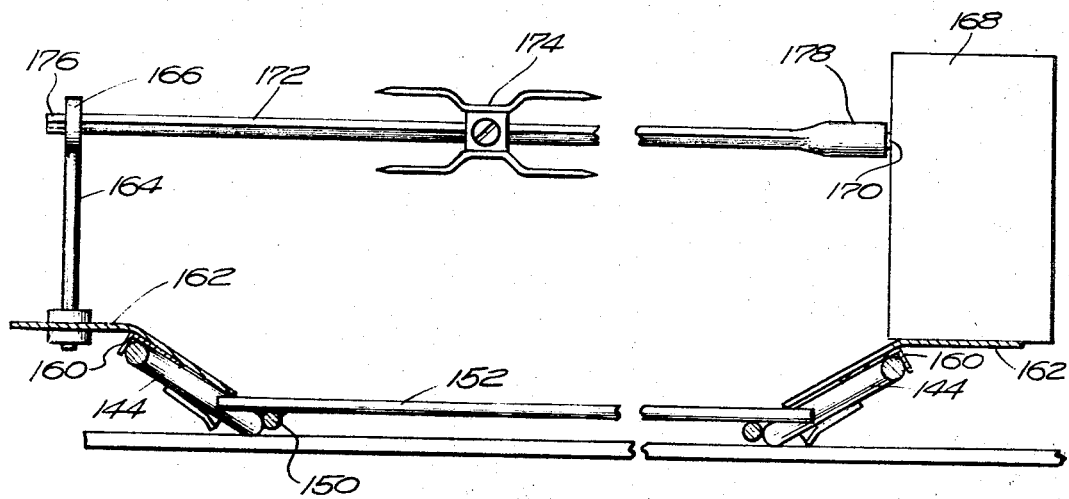
FIG. 10
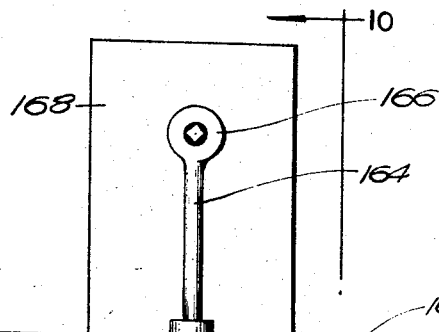
FIG. 11
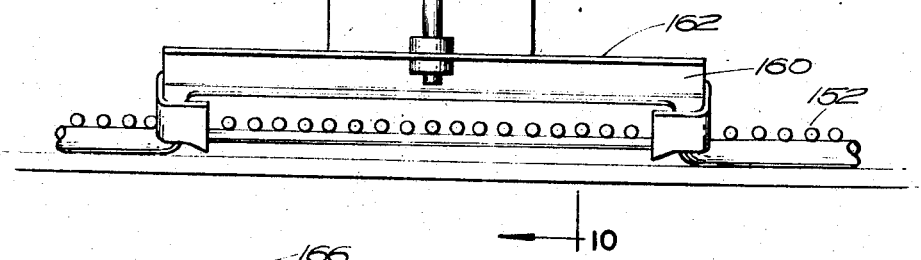
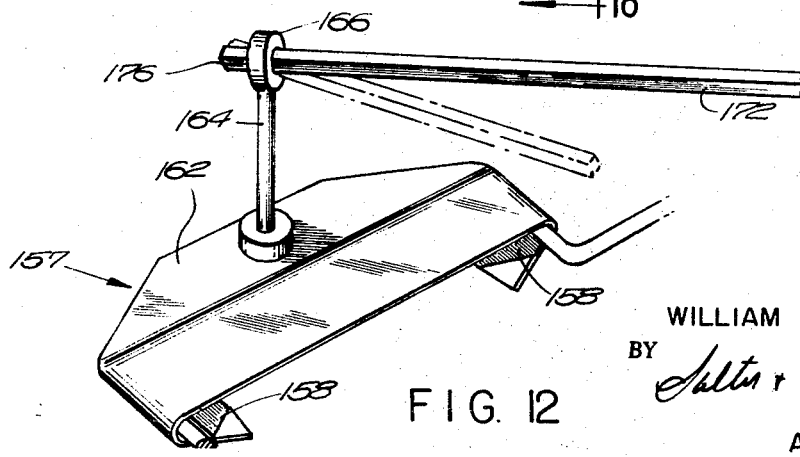
FIG. 12

3,322,060
CHARCOAL GRILL AND THE LIKE
William A. Gilbert, Main St., North Scituate, R.I. 02857
Filed Sept. 14, 1964, Ser. No. 396,246
15 Claims. (Cl. 99—421)

The present invention relates generally to a grill or broiler and is more particularly concerned with a novel and improved grill that is highly adaptable for use with charcoals but which is also capable of advantageous use in gas and electric fired grills. It will therefore be understood that the term "charcoal grill" as used in the specification and claims herein is meant to describe a type of grill and is specifically intended to cover grills of the same type that may be fired by gas or electric elements rather than charcoals.

A primary object of my invention is the provision of a grill particularly adaptable for installation in a kitchen counter, although also adaptable for outdoor use if desired.

A primary object of my invention is the provision of a novel and improved charcoal grill that may be readily and easily installed in a kitchen counter and which may be of the "drop-in" variety, i.e., capable of installation in a counter opening completely surrounded by the counter, as opposed to an opening in communication with the edge of the counter.

Another important object of my invention is the provision of a charcoal grill adapted for installation in a kitchen counter, said grill being completely operable from above, or, expressed differently, said grill having its fire box, grate and ash pan accessible from the top of the grill with the latter two elements readily removable through the top of the grill, thus rendering it completely unnecessary that access to the bottom portion of the grill be provided, such as by having cabinet doors in the kitchen counter in alignment with the grill for permitting such access.

A further object of my invention is the provision of a charcoal grill wherein the distance between the grill rack and fire box is adjustable by raising and lowering the former rather than the latter, as is conventional in the prior art.

Another important object of my invention is the provision of a charcoal grill of the character described wherein a novel and improved insulation system is provided for maintaining all exposed portions of the grill relatively cool when the grill is in operation, with the exception of the grill rack per se.

A further object is the provision of a grill rack of the character described having an ash pan and grate that are easily and readily assembled and removed from the grill, said parts having movable handles for facilitating said assembly and removal.

Another object is the provision of a novel and improved rack frame for supporting the grill rack.

A further object of my invention is the provision of novel and improved means for detachably mounting a rotary spit assembly onto the rack frame.

Still another object is the provision of a charcoal grill of the character described that is economically feasible to manufacture, rugged and durable in operation, and of pleasing appearance.

Other objects, features and advantages of the invention will become apparent as the description thereof proceeds when considered in connection with the accompanying illustrative drawings.

In the drawings which illustrate the best mode presently contemplated for carrying out the present invention:

FIG. 1 is a fragmentary perspective view showing the grill of the instant invention mounted in a counter top;

FIG. 2 is a fragmentary sectional view, on an enlarged scale, taken on line 2—2 of FIG. 1;

FIG. 3 is a fragmentary sectional view, on an enlarged scale, taken on line 3—3 of FIG. 1;

FIG. 10 is a side elevational view illustrating the mounting of the rotary spit assembly;

FIG. 11 is an end elevational view thereof; and

FIG. 12 is a perspective detail illustrating one of the rotary spit mounting brackets.

Figure 4:
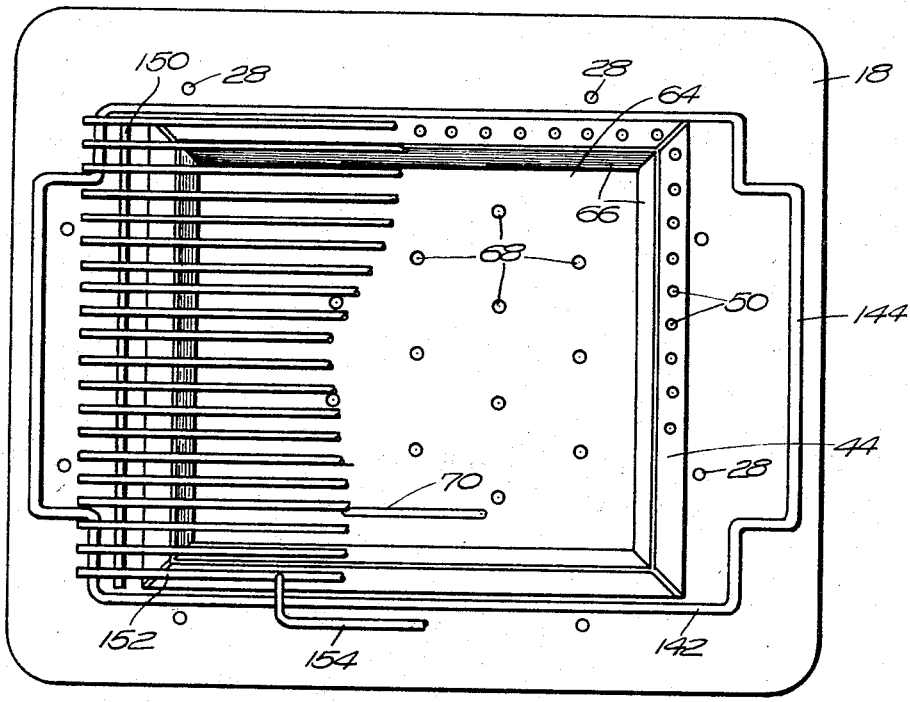
FIG. 4 is a top plan view of my grill, with parts being broken away for purposes of illustration.

Referring now to the drawings, there is shown a counter top 10 which has a protective laminate 12 on its upper surface (FIG. 3), said counter top having a cutout 14 therein suitably dimensioned so as to receive my charcoal grill unit, generally designated at 16. As will be seen most clearly in FIG. 1, the grill 16 is of the "drop-in" variety, it being noted that the counter top completely surrounds the grill when installed, as opposed to the usual counter installation wherein the opening in the counter is in the form of a notch that communicates with the edge of the counted. Such a construction is usually employed where it is necessary to gain access to the lower portion of the grill, such as by having cabinet doors in the counter for permitting such access. As will hereinafter become apparent, the instant invention does not require such access, and hence it is possible to use a "drop-in" mounting for the grill, and at the same time it is not necessary that any cabinet doors be provided in the counter in alignment with the grill. It will be understood that although the instant invention is of particular adaptability for mounting in a kitchen or family room counter, my grill could also be mounted in a suitable portable support, for outdoor as well as indoor use. Where the grill is used as part of an indoor installation, a suitable hood (not shown) is mounted over the grill to vent smoke coming from the grill.

Figures 5, 6, 7:
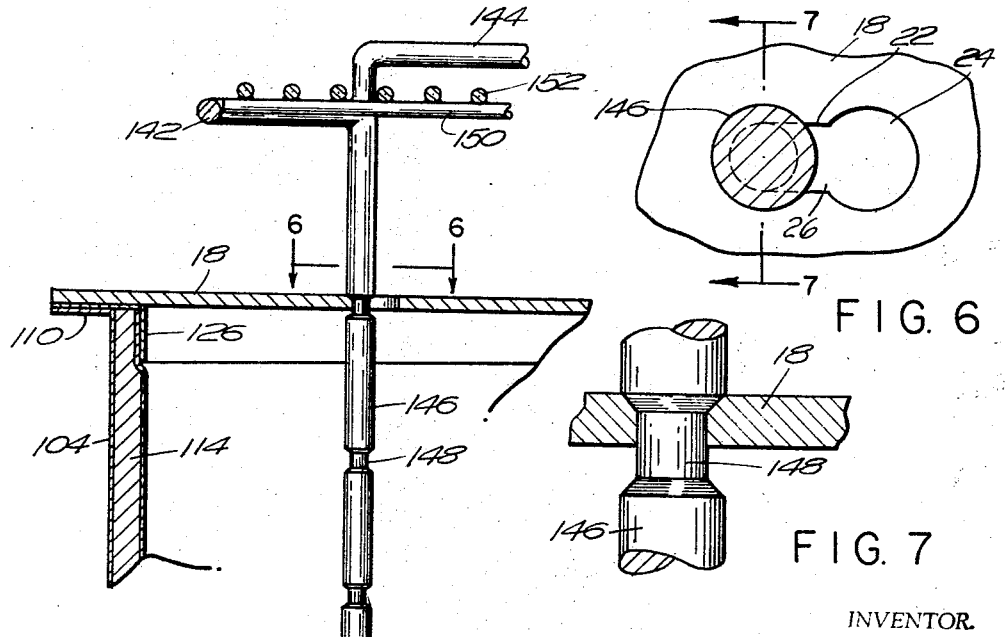
FIG. 5 is a fragmentary sectional view, on an enlarged scale, illustrating the adjustable mounting of the rack frame.
FIG. 6 is a fragmentary section, on an enlarged scale, taken on line 6—6 of FIG. 5.
FIG. 7 is a fragmentary section, on an enlarged scale, taken on line 7—7 of FIG. 6.

The grill 16 comprises a top plate 18, preferably of aluminum approximately 3/16" thick, said top plate having a central opening 20 therein. The plate 18 and opening 20 are preferably of rectangular configuration, although it wil be understood that any desired shape may be utilized. For reasons hereinafter to be made apparent, the top plate 18 has provided at each end thereof a pair of key-shaped cut-outs 22, said cut-outs each comprising an enlarged circular opening 24 in communication with a smaller elongated opening 26 (note FIG. 6). Plate 18 is further characterized by the provision of a plurality of depending threaded studs 28, it being noted (FIG. 9) that two of said studs are provided along each edge of opening 20. The studs 28 are securely affixed to plate 18 by any suitable means, such as being riveted or swaged thereto. Secured to the underside of plate 18 in spaced relation thereto and adjacent the marginal edge of opening 20 is a continuous strip of heat insulating material, such as asbestos or the like, as illustrated at 30. As will be seen most clearly in FIGS. 2, 3 and 8, the insulating strip 30 is preferably constructed of four separate elongated blocks, each having openings 32 extending therethrough for receiving the studs 28. Nuts 34 and washers 36 (FIG. 2) serve to maintain the insulating strip 30 in spaced relation to the under surface of plate 18, this space defining a passage 38, the function of which will hereinafter become apparent.

A fire box 40, preferably constructed of stainless steel, is centrally positioned with respect to opening 20 and is secured to the under surface of insulating strip 30. The fire box 40 specifically comprises side walls 42 each having an outwardly extending flange 44 at its upper edge, each side wall further having an inwardly extending flange 46 at its lower edge. The outwardly extending flanges 44 each having openings 48 provided therein for receiving the studs 28; and adjacent the walls 42, the flanges 44 are each provided with a plurality of passages or openings 50, the function of which will hereinafter be explained.

An ash pan 52 (see FIG. 9), preferably constructed of galvanized steel, depends from the above-described fire box 40. More specifically, ash pan 52 comprises a bottom wall 54 and side walls 56, each of said side walls having an outwardly extending flange 58 at its upper extremity. As will be seen most clearly in FIGS. 2 and 3, the flanges 58 are adapted to overlie the fire box flanges 46, thus removably suspending the ash pan 52 from the fire box. It will be understood that the ash pan is suitably dimensioned so that it may freely drop through the bottom opening of the fire box until the aforesaid flanges engage in order to removably suspend the ash pan in the desecribed manner. Since fire box 40 is centrally positioned with respect to the opening 20, it follows that ash pan 52 is likewise so positioned. In order to facilitate insertion and removal of the ash pan 52, a handle 60 is provided, said handle being pivotally secured to opposed side walls 56 of the ash pan, as at 62, so that said handle may be selectively swung between an operative position (FIG. 9) and an inoperative position (as illustrated in FIGS. 2 and 3).

Figure 9:
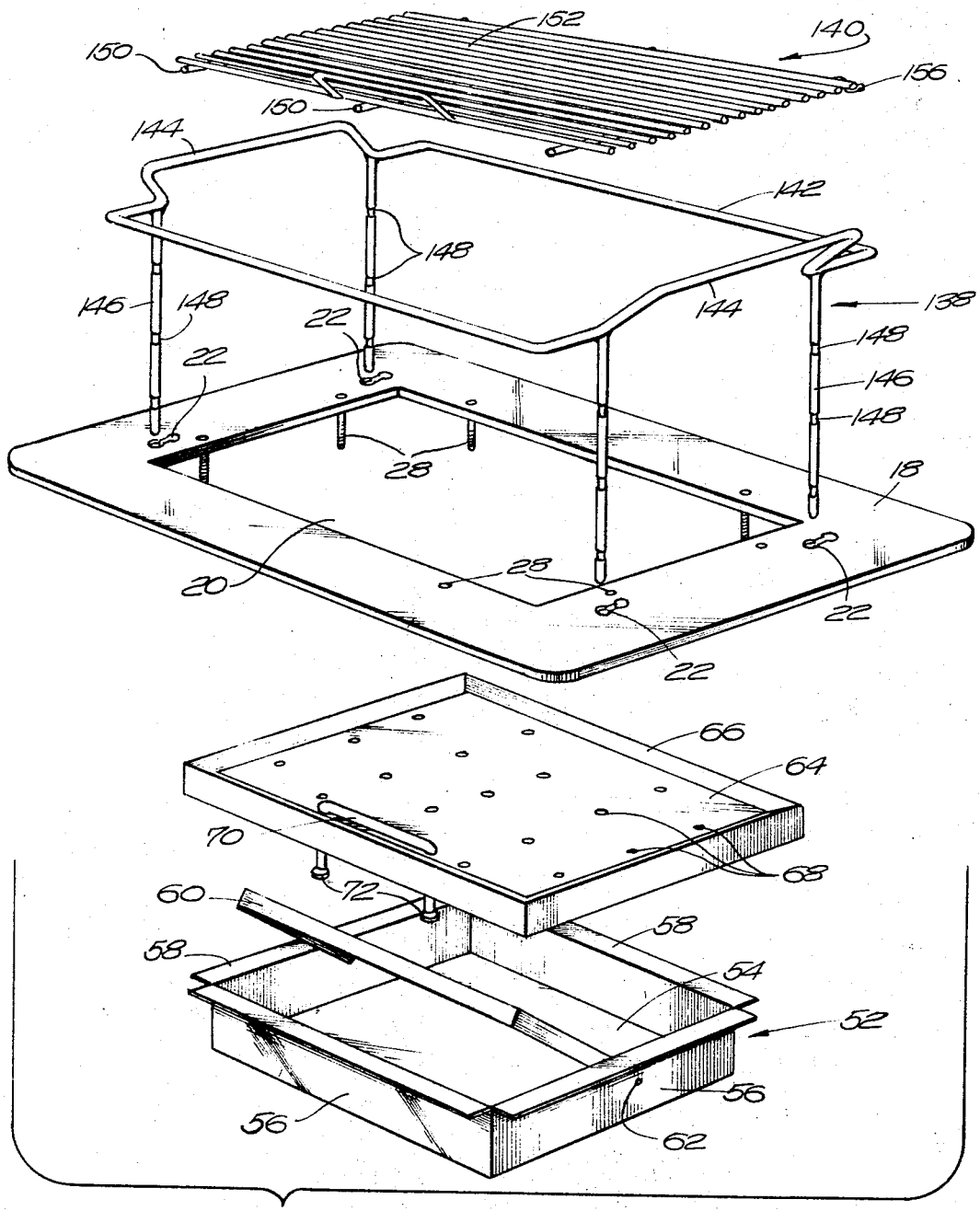

A cast iron grate 64 overlies the ash pan 52 and, more specifically, is removably positioned on top of flanges 58. The cast iron grate 64 is provided with an enlarged peripheral portion 66 which functions to impart additional strength to the grate, and which at the same time minimizes the contact area between the grate and flanges 58. It will be understood that in operation of my charcoal grill, the grate 64 will serve to support the charcoal, and hence, as is conventional, a plurality of openings 68 are provided in the grate 64 for enabling ashes to sift downwardly into the ash pan. In order to facilitate insertion and removal of the grate 64, a handle 70 is provided, said handle being maintained in inoperative position, as illustrated in FIGS. 2 and 9, by gravity, but being movable to an upper operative position simply by grasping the handle and pulling it upwardly until enlarged portions 72 limit further upward movement. It will be understood that the mounting holes 74 in grate 64 through which handle 70 passes are sufficiently large so that the handle can move freely up and down, but by the same token are sufficiently small so that the enlarged portions 72 cannot pass therethrough.

Figure 8:
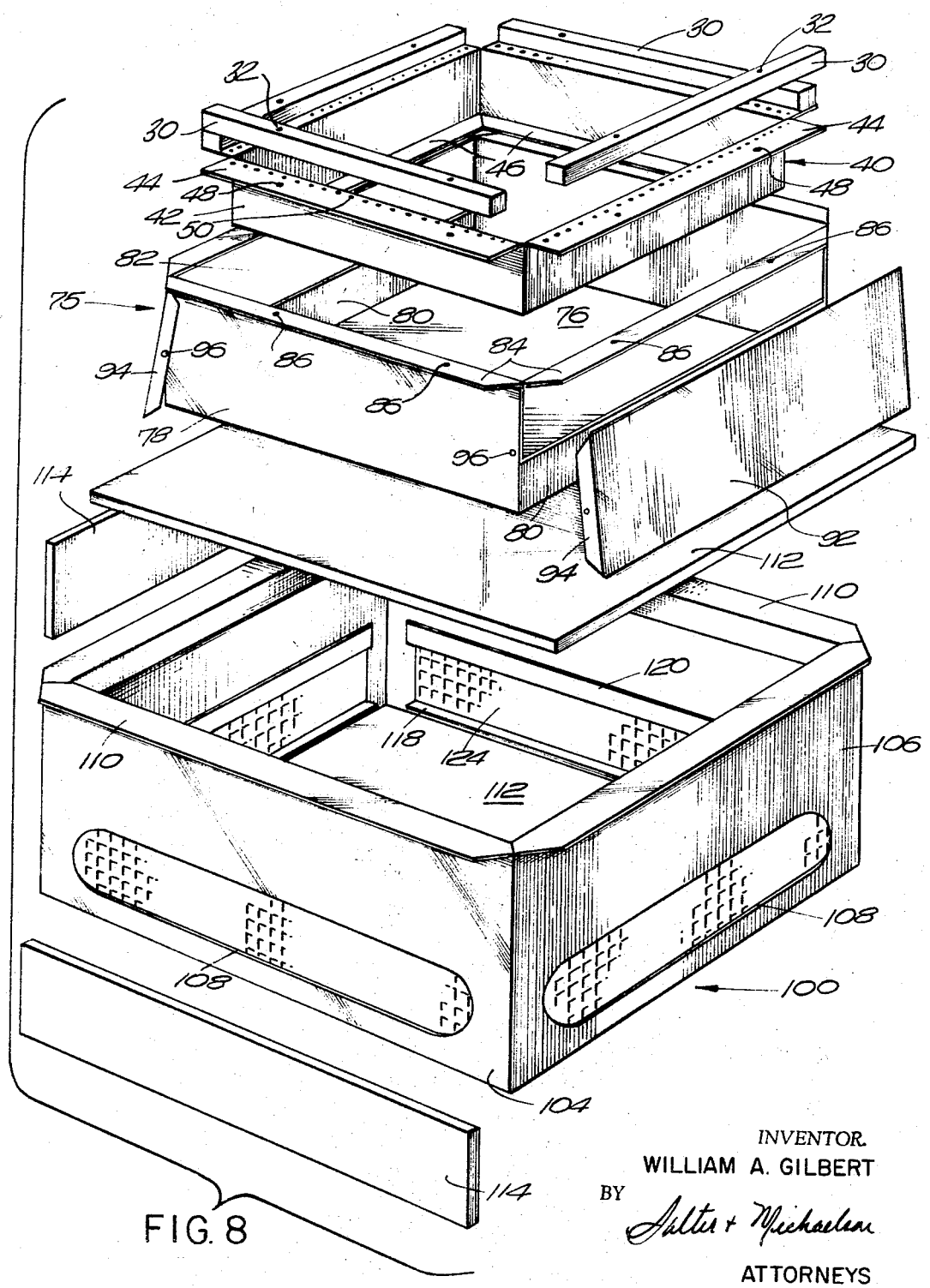
FIGS. 8 and 9 are exploded perspective views illustrating the various parts that comprise my charcoal grill.

An inner jacket 75, also preferably constructed of galvanized steel, surrounds the above-described fire box and ash pan, as will be seen most clearly in FIGS. 2, 3 and 8. Inner jacket 75 comprises bottomwall 76, side walls 78, and end walls 80, the latter of which cover only a part of the ends of the inner jacket, leaving elongated rectangular openings 82 at the upper portion of each end. Inner jacket 75 further comprises flanges 84 which extend horizontally outwardly from the upper peripheral edge of the jacket, said flanges having therein openings 86 for receiving the studs 28. Nuts 88 and washers 90 function to maintain insulating strip 30 and flanges 44 and 84 securely mounted on studs 28, as will be clearly visible from FIGS. 2 and 3. The inner jacket 75 further comprises a pair of end plates 92, each having flanges 94 at opposite extremities thereof adapted to pivotally engage side walls 78 as at 96. It will be understood that any suitable pivot-pin mounting may be employed, and that once the end plates 92 are so mounted, they may be pivotally adjusted with respect to the inner jacket 75 so as to enable any desired venting of air to take place in the direction of the arrows illlustrated in FIG. 3, namely, through the opening 98 defined by the lower edge of end plate 92 and end wall 80 and then upwardly and inwardly through the opening 82, and finally upwardly and through the openings 50 in flanges 44.

An outer jacket 100, also preferably constructed of galvanized steel, is provided, said outer jacket having a bottom wall 102, side walls 104, and end walls 106. All of the side and end walls have openings 108 blanked therein, and at their upper extremities are provided with outwardly extending flanges 110. Bottom wall 102 has positioned thereover a sheet 112 of heat insulating material, while the side and end walls have sheets 114 of similar heat insulating material secured to the upper portions of their inner surfaces. The insulating material may be of any suitable and desired type, although we prefer to use a fireproof Fiberglas-type insulation. The insulating sheets 112 and 114 are secured in their aforedescribed positions within outer jacket 100 by the following structure. Four metallic brackets 116 are provided for this purpose, said brackets each having inwardly extending flanges 118 at their lower extremities which function to maintain insulation 112 in position and inwardly extending offset portions 120 at their upper extremities functioning to receive and secure the lower ends of insulating sheets 114. The brackets 116 are secured to the side and end walls of outer jacket 100 by any suitable means, such as spot welding or the like, as illustrated at 122 in FIGS. 2 and 3, and said brackets have blanked-out screen portions 124 which cover the openings 108 in the jacket 100, while at the same time permitting the passage of air therethrough. The upper portions of insulating sheets 114 are secured in position by means of metallic angle strips 126, said strips having flanges 128 which abut the aforesaid flanges 110 and are secured thereto by spot welding or the like.

The entire hereinbefore described assembly, comprising top plate 18, fire box 40, ash pan 52, inner jacket 75, and outer jacket 100, is mounted in counter opening 14 by a conventional counter frame assembly illustrated generally at 130 in FIG. 3. This assemby comprises a frame 132 secured to counter 10 around the peripheral edge of opening 14 and having a lug 134 through which a clamping screw 136 extends at spaced intervals in order to securely clamp the entire assembly in operative position in the counter top.

In order to support the food products being grilled, a rack frame 138 and a rack 140 (FIG. 9) are provided. The rack frame 138 is preferably constructed of plated steel and comprises a substantially horizontal and rectangular frame 142 having integral handle portions 144, and further having a plurality of depending legs 146, each having a plurality of spaced reduced portions 148. The reduced portions 148 of each leg 146 are in horizontal alignment with the comparable reduced portions of the other legs. The legs 146 are received by the openings 22 in top plate 18, and, specifically, the enlarged portion 24 of each opening 22 is of sufficient size to receive the larger diameter of each leg. On the other hand, the reduced portion 26 of each cutout 22 is large enough to receive the reduced portion 148 of the legs 146 but is too small to receive the remaining portion of each leg. Thus, the height of the rack frame with respect to top plate 18 may be easily adjusted simply by raising or lowering the legs 146 through enlarged opening 24 until the approximate desired height is obtained and then moving the rack frame laterally so that the aligned reduced portions 148 of each of the legs move into reduced portions 26 of the cut-outs 22. In this position, the rack frame is prevented from either moving upwardly or downwardly until the rack frame is once again moved laterally so that the legs 146 are in the enlarged openings 24. The rack 140, which is preferably of stainless steel, comprises a plurality of cross rods 150 which have secured thereto, as by welding or the like, a plurality of spaced parallel longitudinally extending rods 152. One of the end rods 152 is provided with an upwardly extending handle 154, while the rods 150, at one of their ends, are provided with downwardly extending offset portions 156 which cooperate with frame 142 to prevent undesirable transverse movement of the rack with respect to the rack frame. It will be understood that the length of the rods 152 is slightly longer than the longitudinal dimension of frame 142, whereupon the rack is adapted to be removably seated on the frame with the ends of the rods 152 overlying portions of the frame and with the transverse rods 150 positioned within the frame, as most clearly illustrated in FIG. 4. Since the rack 140 is removably positioned on rack frame 138, and since the height of the latter is adjustable with respect to top plate 18, as hereinbefore described, it follows that the distance between the food being grilled and the fire box is readily adjustable by selectively positioning the rack frame at the desired height. This represents a departure over the conventional prior art structure wherein the distance between the rack and the fire box is most usually variable by adjustment of the latter. It has been found that by adjusting the height of the rack, as per the instant invention, a more uniform and satisfactory application of heat is accomplished.

As hereinbefore described, the rack 140, rack frame 138, grate 64 and ash pan 52 are readily removable from the overall assembly. Furthermore, the removal of all of these parts is effected from above the grill assembly, thus eliminating the necessity of having access to the lower portion of the grill from the side, as by having cabinet doors in the counter 10. In order to disassemble the aforesaid parts, it is simply necessary to do the following. First of all, the rack 140 may be lifted off of the rack frame 138. The rack frame 138, in turn, is readily removable by first laterally shifting the rack frame so that the legs 146 are in alignment with enlarged portions 24 of cutouts 22. Once these legs are so aligned, the rack frame may be lifted upwardly and disassembled from the grill. By reaching inwardly through opening 20, the grate 64 may be removed by grasping handle 70 and lifting the grate upwardly through the said opening. It will be understood that when handle 70 is grasped, it will automatically move upwardly to operative positon for easier gripping. Once the grate has been removed, the ash pan 52 may be readily removed by grasping handle 60 and swinging it upwardly for easier handling, after which the ash pan may be easily lifted upwardly through opening 20 so that any ashes that have accumulated therein may be disposed of.

When food products are being grilled, it will be understood that the charcoals will be positioned on grate 64 and the rack frame 138 positioned so as to maintain rack 140 at the desired height above the charcoals. During the cooking operation, air will be drawn in through the openings 108 in outer jacket 100, and the majority of this incoming air will pass upwardly between the inner and outer jackets, as illustrated by the arrows to the left in FIG. 3, and then this air will pass through passageway 38 and then upwardly through central opening 20. The remaining air that is drawn in through the openings 108 is vented upwardly through the passageway 98 and then through openings 82, and then finally through the openings 50 in flange 44 and then upwardly through central opening 20. This path of flow is illustrated by the arrows on the right in FIG. 3. It has been found that best results are obtained when end plates 92 are adjusted so that approximately 22 percent of the incoming air is vented upwardly through openings 98, while the remaining 78 percent passes upwardly between the inner and outer jackets. The combination of this air flow circulatory system with the insulation 30, 112 and 114 maintains the outer jacket 100 and top plate 18 completely cool so that should these portions be inadvertently touched, no dangerous burns can possibly result. Actually, it will be understood that outer jacket 100 is not exposed unless there happens to be a counter cabinet in alignment with the grill. However, it is still important that heat not radiate from the outer jacket; since if such were not the case, a dangerous fire hazard would exist. Top plate 18, on the other hand, may often be touched during use and operation of the grill, and hence it is of the utmost importance that this part not become hot, which, as hereinbefore explained, does not happen with my structural arrangement. The insulating strip 30, in addition to acting as a heat insulator between the fire box and plate 18, also functions to impede any sparks from flying outwardly into the outer jacket.

Referring now to FIGS. 10 through 12, means are shown for detachably mounting a rotating spit above the grill. To this end, there is provided a pair of metallic brackets, shown generally at 157 in FIG. 12, each of said brackets having channel portions 158 at opposite extremities thereof, said brackets being dimensioned so that the channels may slidably and snugly engage the handles 144 of rack frame 138. A metallic angle member 160 is secured to the underside of bracket 157 and acts as a stop for limiting sliding movement of the brackets with respect to the handles, as most clearly illustrated in FIG. 10. The brackets 157 further have an angularly extending plate portion 162 so inclined as to be horizontally disposed when the brackets are slidably engaged with the handles 144, as will be clearly seen in FIG. 10. One of the brackets 157 has rotatably mounted on its plate portion 162 an upstanding support 164 having an eye socket 166 at its upper extremity. The opposite bracket 157 has mounted thereon a motor assembly 168 having a keyed shaft 170 extending therefrom. A spit 172 having conventional meat supporting means 174 slidably mounted thereon is operatively mounted by first rotating the support 164 so that the end 176 of spit 172 can be easily and conveniently inserted through the eye socket 166. The support 164 is then rotated so as to align the spit 172 with the motor assembly 168, and the spit is then slid toward the motor assembly until socket 178 at the opposite end of the spit receives keyed shaft 170 therein so as to effect driving engagement between the motor assembly and the spit. Since the entire spit assembly is mounted on rack frame 138, it follows that the height of the spit above top plate 16 may be adjusted by selectively adjusting the height of the rack frame as hereinbefore described. It will be understood that the motor assembly 168 is connected to a suitable source of electricity by an electric cord (not shown) and further that suitable switching means (not shown) are provided for turning the motor on and off.

While there is shown and described herein certain specific structure embodying the invention, it will be manifest to those skilled in the art that various modifications and rearrangements of the parts may be made without departing from the spirit and scope of the underlying inventive concept. For example, as hereinbefore stated, it is not necessary that my grill be charcoal fired, but rather it is completely within the scope and spirit of my invention to employ gas or electric means for generating cooking heat. In such an event, suitable gas or electric elements (not shown) would be utilized in place of grate 64 and ash pan 52. Thus, my invention is not limited to the particular forms herein shown and described except insofar as indicated by the scope of the appended claims, wherein such terms as "charcoal" should be deemed to cover equivalents thereof, such as gas and electric.

What is claimed is:

1. A charcoal grill comprising a horizontal top plate having a central opening therein, means for supporting charcoal and the like below said opening, a rack frame comprising a plurality of vertical legs, each of said legs having a plurality of spaced reduced portions in horizontal alignment with the reduced portions of the other legs, and a plurality of cutouts in said top plate receiving said legs, each of said cutouts comprising a first portion large enough to freely receive said vertical legs and a second portion in communication therewith large enough to receive the reduced portions of each leg but smaller than the remaining portions of the legs, whereby the height of said rack frame above said top plate may be readily adjusted by laterally moving said legs so that preselected reduced portions thereof are located in the aforesaid second portions of said cutouts.

2. The charcoal grill of claim 1 further characterized in that said rack frame comprises a pripheral horizontal portion from which said legs depend, and a rack element removably supported by said peripheral portion and overlying said central opening, said rack frame being readily separable from said top plate.

3. A charcoal grill comprising a horizontal top plate having a central opening therein defining an inner edge, an outer jacket surrounding said central opening and secured to and depending from said top plate, an opening in said outer jacket, a continuous length of heat insulating means mounted below the inner edge of said top plate and in spaced relation thereto, an inner jacket secured to and depending from said insulating means, an opening in said inner jacket, and a fire box also secured to and depending from said insulating means, said fire box being located interiorly of said inner jacket and having an opening adjacent its upper extremity.

4. The charcoal grill of claim 3 further characterized in that said outer jacket is provided with heat insulating means covering substantially the entire jacket except for the opening therein.

5. The charcoal grill of claim 3 further characterized by the provision of a rack frame removably supported by said top plate, and means for enabling said rack frame to be vertically adjusted above said top plate.

6. In the charcoal grill of claim 5, said last-mentioned means being characterized in that said rack frame comprises a plurality of vertical legs, each of which has a plurality of spaced reduced portions in horizontal alignment with the reduced portions of the other legs, and a plurality of cutouts in said top plate receiving said legs, each of said cutouts comprising a first portion large enough to freely receive said vertical legs and a second portion in communication therewith large enough to receive the reduced portions of each leg but smaller than the remaining portions of the legs, whereby the height of said rack frame above said top plate may be readily adjusted by laterally moving said legs so that preselected reduced portions thereof are located in the aforesaid second portions of said cutouts.

7. A charcoal grill comprising a horizontal top plate having a central opening therein defining an inner edge, an outer jacket having end, side and bottom walls secured to and depending from said top plate and surrounding said central opening, an opening in the lower portion of said side and end walls and heat insulating means covering said side, end and bottom walls, a continuous length of heat insulating means mounted below the inner edge of said top plate and in spaced relation thereto, an inner jacket having end, side and bottom walls secured to and depending from said insulating means, vent means adjacent the lower portion of said inner jacket, and a fire box having a marginal horizontal flange at its upper extremity, means supporting said flange so that said fire box depends interiorly of said inner jacket, and a plurality of openings in said flange.

8. The charcoal grill of claim 7 further characterized in that said fire box has a marginal, inwardly extending flange at its lower extremity, an ash pan having a marginal, outwardly extending flange overlying said inwardly extending flange whereby said ash pan depends from the lower end of said fire box and is readily removable therefrom, and a grate freely positioned on top of said ash pan flange and overlying said ash pan.

9. The charcoal grill of claim 8 further characterized in that said grate and ash pan each have handles movable between an operative and inoperative position for facilitating removal of said grate and ash pan.

10. The charcoal grill of claim 8 further characterized in that said inner jacket vent means are readily adjustable for controlling the flow of air into said inner jacket.

11. The charcoal grill of claim 8 further characterized by the provision of a rack frame supported by said top plate, and means for enabling said rack frame to be vertically adjusted above said top plate.

12. The charcoal grill of claim 11 further characterized in that said rack frame has a separate rack element removably mounted thereon, said rack element overlying said central opening.

13. The charcoal grill of claim 11 further characterized in that said rack frame is readily removable from said top plate.

14. In the charcoal grill of claim 11, said last-mentioned means being characterized in that said rack frame comprises a plurality of vertical legs, each of which has a plurality of spaced reduced portions in horizontal alignment with the reduced portions of the other legs, and a plurality of cutouts in said top plate receiving said legs, each of said cutouts comprising a first portion large enough to freely receive said vertical legs and a second portion in communication therewith large enough to receive the reduced portions of each leg but smaller than the remaining portions of the legs, whereby the height of said rack frame above said top plate may be readily adjusted by laterally moving said legs so that preselected reduced portions thereof are located in the aforesaid second portions of said cutouts.

15. The charcoal grill of claim 11 further characterized in that means are provided for removable attachment to said rack frame for rotatingly supporting a spit above said central opening.

References Cited

UNITED STATES PATENTS

| | | |
|---|---|---|
| 1,309,049 | 7/1919 | Syrett. |
| 2,213,483 | 9/1940 | Benson _____ 126—9 X |
| 2,386,815 | 10/1945 | Rubenstein. |
| 2,654,307 | 10/1953 | Nisenson _____ 99—421 |
| 2,874,631 | 2/1959 | Cooksley. |

WALTER A. SCHEEL, *Primary Examiner.*

J. NEARY, *Assistant Examiner.*